(12) United States Patent
Maton et al.

(10) Patent No.: US 11,434,969 B2
(45) Date of Patent: Sep. 6, 2022

(54) HYDRAULIC DAMPER ASSEMBLY INCLUDING AN ANTI-NOISE MEMBER

(71) Applicant: BeijingWest Industries Co., Ltd., Beijing (CN)

(72) Inventors: Piotr Grzegorz Maton, Cracow (PL); Pawel Edward Kus, Cracow (PL); Dominik Kasprzyk, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 17/134,407

(22) Filed: Dec. 26, 2020

(65) Prior Publication Data
US 2021/0199172 A1 Jul. 1, 2021

Related U.S. Application Data

(60) Provisional application No. 62/954,403, filed on Dec. 27, 2019.

(30) Foreign Application Priority Data

Dec. 8, 2020 (CN) .......................... 202011420875.9

(51) Int. Cl.
  *F16F 9/34* (2006.01)
  *F16F 9/02* (2006.01)
  *F16F 9/18* (2006.01)

(52) U.S. Cl.
  CPC ............ *F16F 9/341* (2013.01); *F16F 9/0227* (2013.01); *F16F 9/18* (2013.01); *F16F 9/3405* (2013.01); *F16F 2230/02* (2013.01)

(58) Field of Classification Search
  CPC .. F16F 9/341; F16F 9/0227; F16F 9/18; F16F 9/3405; F16F 9/483; F16F 2230/02; F16F 2230/42; F16F 2228/066
  See application file for complete search history.

(56) References Cited

U.S. PATENT DOCUMENTS

| 3,214,182 A | 10/1965 | Herbruggen |
| 3,828,897 A | 8/1974 | Nandyal |

(Continued)

FOREIGN PATENT DOCUMENTS

| CN | 203453374 U | 2/2014 |
| CN | 106090114 A | 11/2016 |

(Continued)

OTHER PUBLICATIONS

The extended European search report dated Jun. 4, 2021 for counterpart European patent application No. 20216455.4.

(Continued)

*Primary Examiner* — Thomas W Irvin
(74) *Attorney, Agent, or Firm* — William H. Honaker; Dickinson Wright PLLC (57) ABSTRACT

A hydraulic damper assembly comprises a main tube extending between a first and a second end and defining a fluid chamber extending therebetween. A main piston slidably disposed in the fluid chamber divides the fluid chamber into a compression chamber and a rebound chamber. A piston rod attaches to the main piston. An additional piston couples to the piston rod axially spaced from the main piston. The additional piston has a top surface and a bottom surface and defines at least one pathway extending through the additional piston. The additional piston defines a recess bounded by an upper surface and a lower surface. A ring slidably is disposed in the recess. The additional piston includes an anti-noise member located in the recess whereby the anti-noise member releases fluid pressure between the ring and the upper surface reducing noise generation during a compression stroke and a rebound stroke.

16 Claims, 9 Drawing Sheets

(56) References Cited

U.S. PATENT DOCUMENTS

| | | | |
|---|---|---|---|
| 4,577,870 A | 3/1986 | Scott et al. | |
| 5,157,806 A * | 10/1992 | Wartian | E05F 3/02 |
| | | | 16/49 |
| 6,129,358 A | 10/2000 | Kiesel et al. | |
| 6,311,813 B1 | 11/2001 | Lauderbach | |
| 9,605,726 B2 * | 3/2017 | Baldoni | B60G 15/062 |
| 9,651,110 B2 * | 5/2017 | Takeno | F16F 9/585 |
| 10,208,830 B2 * | 2/2019 | Bruno | F16F 9/516 |
| 10,393,211 B2 * | 8/2019 | Grzesik | F16F 9/483 |
| 10,603,974 B2 * | 3/2020 | Kasprzyk | F16F 9/49 |
| 11,047,445 B2 * | 6/2021 | Sankaran | F16F 9/49 |
| 11,181,161 B2 * | 11/2021 | Baldoni | F16F 9/49 |
| 2014/0144737 A1 | 5/2014 | Endo et al. | |
| 2014/0326556 A1 | 11/2014 | Ruhlman et al. | |
| 2015/0090548 A1 * | 4/2015 | Yamanaka | F16F 9/3271 |
| | | | 188/297 |
| 2018/0058533 A1 | 3/2018 | Bruno et al. | |
| 2018/0223941 A1 * | 8/2018 | Grzesik | F16F 9/49 |
| 2018/0223942 A1 | 8/2018 | Kus et al. | |
| 2019/0040925 A1 | 2/2019 | Alzer et al. | |
| 2019/0322151 A1 * | 10/2019 | Kasprzyk | F16F 9/368 |
| 2020/0173513 A1 * | 6/2020 | Woenarta | B60G 17/08 |
| 2021/0018059 A1 * | 1/2021 | Sankaran | F16F 9/3214 |

FOREIGN PATENT DOCUMENTS

| | | |
|---|---|---|
| CN | 107002805 A | 8/2017 |
| CN | 107246452 A | 10/2017 |
| CN | 107771255 A | 3/2018 |
| CN | 108050195 A | 5/2018 |
| DE | 102014203598 A1 | 8/2015 |
| DE | 102019215559 A1 | 4/2021 |
| EP | 3366945 A1 | 8/2018 |
| EP | 3569891 A1 | 11/2019 |
| FR | 2665234 A1 | 1/1992 |
| GB | 722812 A | 2/1955 |
| JP | 2019184033 A | 10/2019 |

OTHER PUBLICATIONS

First Office Action and Search Report dated Feb. 18, 2022 for counterpart Chinese patent application No. 202011420875.9, along with machine EN translation downloaded from EPO.

* cited by examiner

HYDRAULIC DAMPER ASSEMBLY INCLUDING AN ANTI-NOISE MEMBER

CROSS REFERENCE TO RELATED APPLICATION

The present application claims the benefit of U.S. Provisional Application Patent Ser. No. 62/954,403, filed Dec. 27, 2019, and Chinese Patent Application No. 202011420875.9, filed on Dec. 8, 2020, the entire contents of which are incorporated herein by reference in their entireties.

BACKGROUND OF THE INVENTION

1. Field of the Invention

The present invention relates generally to a hydraulic damper assembly.

2. Description of the Prior Art

A hydraulic damper assembly including a hydraulic compression stop generates an additional damping force over a predefined section of the piston rod travels as the piston rod travels during a compression stroke. Traditionally, a hydraulic damper assembly for a vehicle is provided with a first end stop member, which is arranged inside the hydraulic damper assembly and is configured to operate during the rebound stroke of the hydraulic damper assembly, and a second end stop member, which is arranged outside the shock-absorber and is configured to operate during the compression stroke of the hydraulic damper assembly. The end stop members may be of elastic or hydraulic type.

One such a hydraulic damper assembly is disclosed in U.S. Patent Application US20180223942. The hydraulic damper assembly comprises a main tube disposed on a center axis extending between a first end and a second end. The main tube defines a fluid chamber extending along the center axis for containing a working fluid. A main piston is slidably disposed in the fluid chamber, movable along the center axis, dividing the fluid chamber into a compression chamber and a rebound chamber. The compression chamber extends between the first end and the main piston. The rebound chamber between the second end and the main piston. A piston rod extends along the center axis and attaches to the main piston for moving the main piston between a compression stroke and a rebound stroke. An additional piston couples to the piston rod, axially spaced from the main piston, located in the fluid chamber, to provide an additional damping force during the compression stroke and the rebound stroke. The additional piston has a top surface and a bottom surface and defines at least one pathway extending through the additional piston. The additional piston defines a recess bounded by an upper surface and a lower surface, located between the top surface and the bottom surface, extending about the additional piston. A ring is slidably disposed in the recess.

During operation, the ring bends when entering an insert of a hydraulic compression stop or engaging a narrowed portion of the housing of the hydraulic damper. Because of the clearance between the additional piston and the ring, it leads to formation of an oil cushion in between the ring and the additional piston. Accordingly, a high pressure oil cushion is created under the bended ring. The high pressure oil cushion affects the sealing engagement between the ring and the upper surface of the recess by maintaining a clearance gap between the ring and main piston. Due to the formation of the clearance gap, micro-leak (slit) from the high pressure oil cushion occurs which leads to a squeaking noise during the operation of the hydraulic damper assembly.

SUMMARY OF THE INVENTION

The present invention in its broadest aspect provides for a hydraulic damper assembly that prevents the formation of the high pressure oil cushions during the operation of the hydraulic damper assembly. The present invention also provides a hydraulic damper assembly that has a reduced noise generation during operation. The present invention further provides a simplified, low cost hydraulic damper assembly wherein the hydraulic damper assembly has a reduced noise generation during operation.

It is one aspect of the present invention to provide a hydraulic damper assembly. The hydraulic damper assembly comprises a main tube disposed on a center axis extending between a first end and a second end. The main tube defines a fluid chamber extending along the center axis for containing a working fluid. A main piston is slidably disposed in the fluid chamber, movable along the center axis, dividing the fluid chamber into a compression chamber and a rebound chamber. The compression chamber extends between the first end and the main piston. The rebound chamber between the second end and the main piston. A piston rod extends along the center axis and attaches to the main piston for moving the main piston between a compression stroke and a rebound stroke. An additional piston couples to the piston rod, axially spaced from the main piston, located in the fluid chamber, to provide an additional damping force during the compression stroke and the rebound stroke. The additional piston has a top surface and a bottom surface and defines at least one pathway extending through the additional piston. The additional piston defines a recess bounded by an upper surface and a lower surface. The recess, located between the top surface and the bottom surface, extends about the additional piston. A ring is slidably disposed in the recess. The additional piston includes an anti-noise member, located in the recess, whereby the anti-noise member releases fluid pressure between the ring and the upper surface of the recess thereby reducing noise generation during the compressions stroke and the rebound stroke.

It is another aspect of the present invention to provide a hydraulic damper assembly. The hydraulic damper assembly comprises a main tube disposed on a center axis extending between a first end and a second end. The main tube defines a fluid chamber extending along the center axis for containing a working fluid. An external tube, disposed spaced apart from the main tube, extends about the main tube between a closed end and an opened end. The closed end is adjacent to the first end. The opened end is adjacent the second end. The main tube and the external tube define a compensation chamber extending therebetween. A cap attaches to the closed end to close the fluid chamber and the compensation chamber. A main piston is slidably disposed in the fluid chamber, movable along the center axis, dividing the fluid chamber into a compression chamber and a rebound chamber. The compression chamber extends between the first end and the main piston. The rebound chamber between the second end and the main piston. A piston rod extends along the center axis and attaches to the main piston for moving the main piston between a compression stroke and a rebound stroke. An additional piston couples to the piston rod, axially spaced from the main piston, located in the fluid chamber, to provide an additional damping force during the compression stroke and the rebound stroke. The additional piston has a top surface and a bottom surface and defines at least one pathway extending through the additional piston. The additional piston defines a recess bounded by an upper surface and a lower surface. The recess, located between the top surface and the bottom surface, extends about the additional piston. A ring is slidably disposed in the recess. The additional piston includes an anti-noise member, located in the recess, whereby the anti-noise member releases fluid pressure between the ring and the upper surface of the recess thereby reducing noise generation during the compressions stroke and the rebound stroke.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
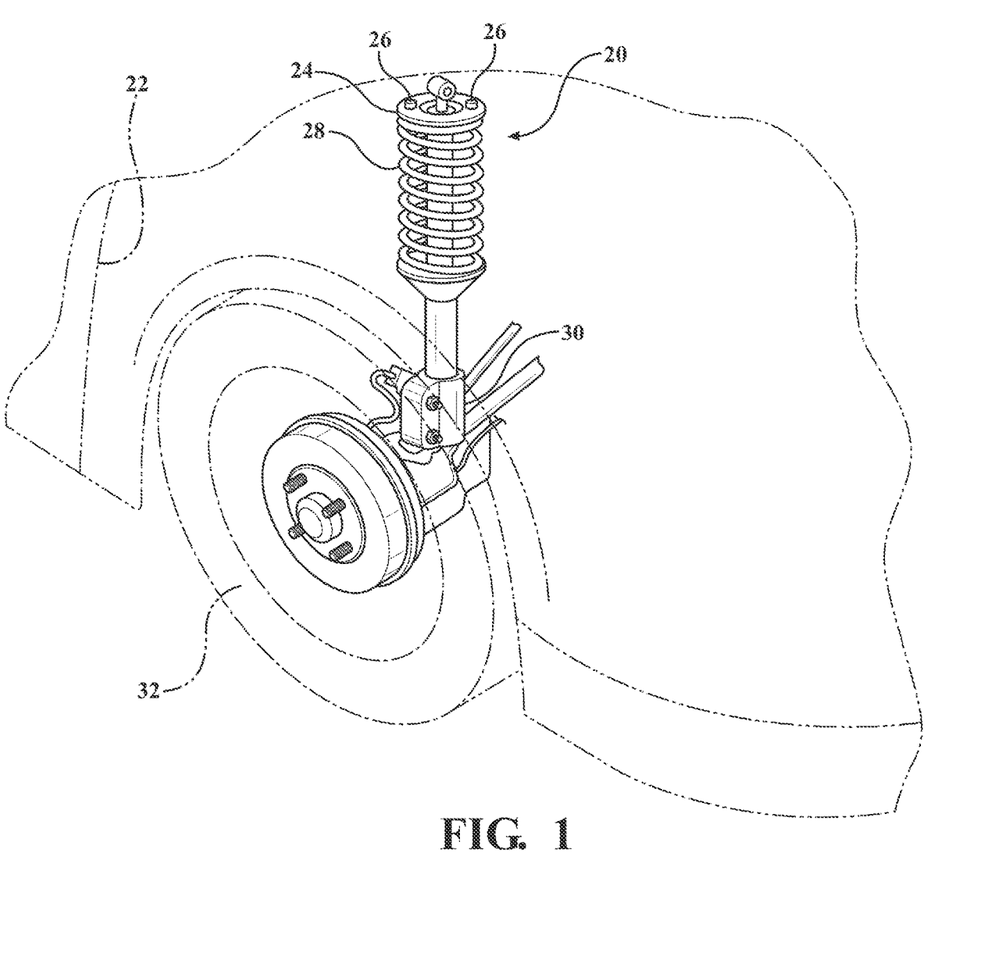
FIG. 1 is a fragmentary view of a vehicle suspension including a hydraulic damper assembly constructed in accordance with one embodiment of the present invention.
Figure 2:
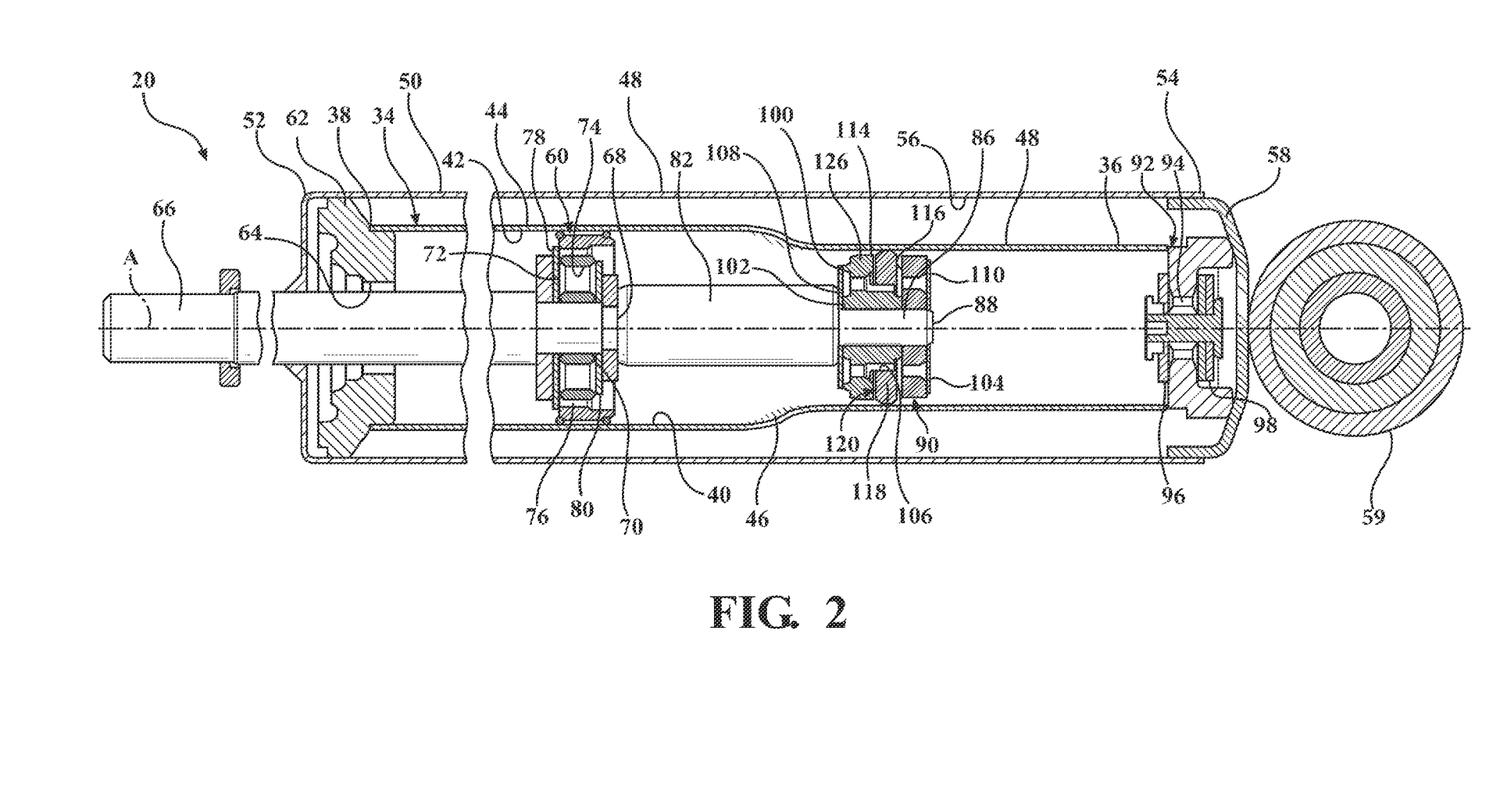
FIG. 2 is a cross-sectional perspective view of the hydraulic damper assembly including a hydraulic compression stop constructed according to one embodiment of the present invention.
Figure 3:
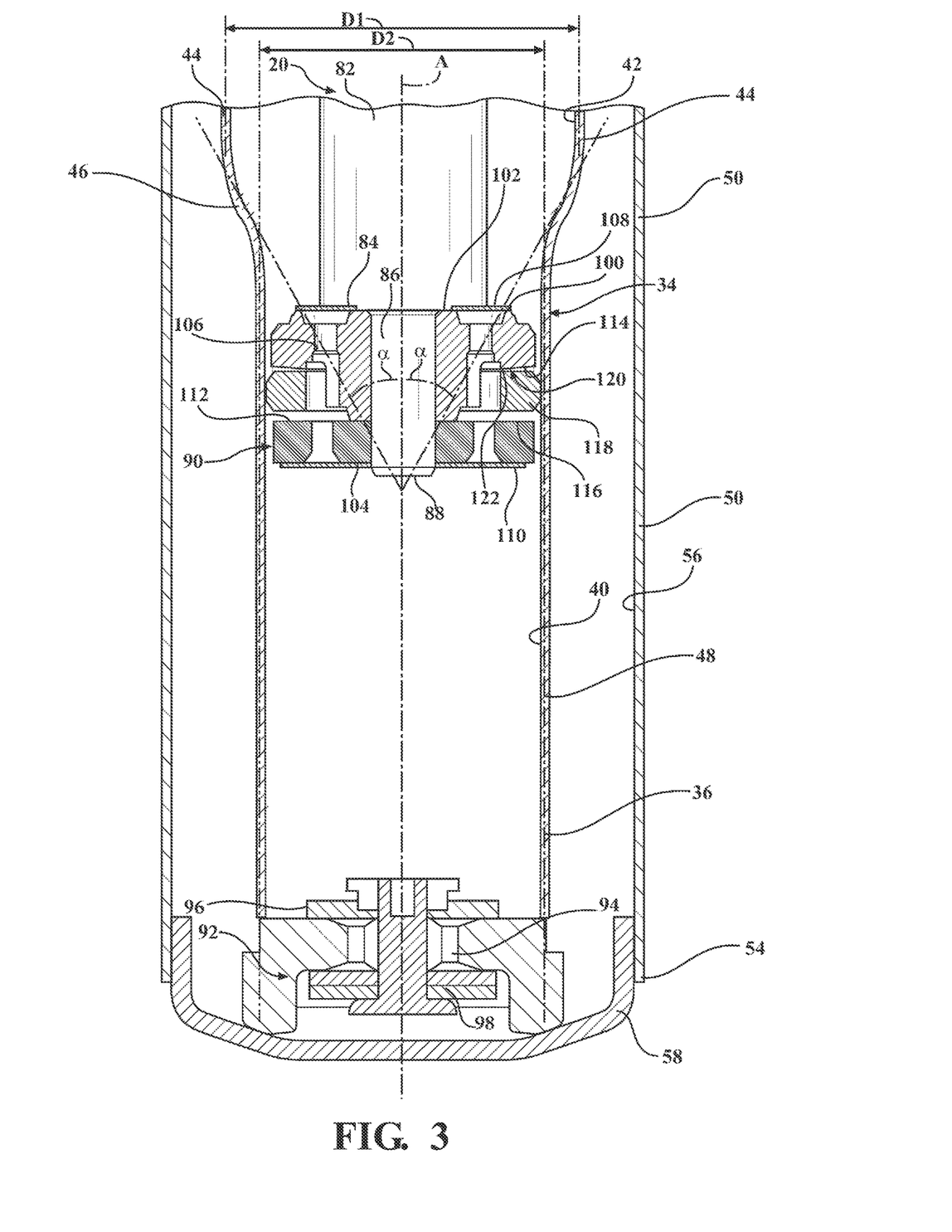
FIG. 3 is a cross-sectional exploded view of the hydraulic damper assembly including the hydraulic compression stop according to one embodiment of the present invention.

Referring to the Figures, wherein like numerals indicate corresponding parts throughout the several views, a hydraulic damper assembly 20 constructed in accordance with one embodiment of the present invention is generally shown in FIGS. 1-3.

FIG. 1 illustrates a fragment of an exemplary vehicle suspension including the hydraulic damper assembly 20 being attached to a vehicle chassis 22 via a top mount 24 and a number of screws 26 disposed on a periphery of an upper surface of the top mount 24. The top mount 24 connects to a coil spring 28. The hydraulic damper assembly 20 connects to the steering knuckle 30 supporting vehicle wheel 32. It should be noted that the hydraulic damper assembly 20 of the present invention can be a low damping hydraulic damper or a high damping hydraulic damper.

According to an embodiment of the present invention, a low damping hydraulic damper 20 is shown in FIGS. 2-3. The low damping hydraulic damper 20 includes a main tube 34, having a generally cylindrical shape, disposed on a center axis A. The main tube 34 extends annularly about the center axis A between a first end 36 and a second end 38. The main tube 34 defines a fluid chamber 40, 42 extending along the center axis A between the first end 36 and the second end 38 for containing a working fluid. According to an embodiment of the present invention, the main tube 34 has a main portion 44, an intermediary portion 46, and a narrowed portion 48. The main portion 44, having a first predetermined diameter $D_1$, extends from the second end 38 toward the first end 36. The narrowed portion 48, axially spaced from the main portion 44 and having a second predetermined diameter $D_2$, extends from the first end 36 toward the second end 38 wherein the second predetermined diameter $D_2$ is less than the first predetermined diameter $D_1$. The intermediary portion 46 extends between the main portion 44 and the narrowed portion 48 at predetermined angle α relative to the center axis A to couple the main portion 44 to the narrowed portion 48. According to an embodiment of the present invention, the predetermined angle α is less than 90° to provide a smooth transition from the main portion 44 to the narrowed portion 48, i.e. the intermediary portion 46 provides a smooth transition from the first predetermined diameter $D_1$ of main portion 44 to the second predetermined diameter $D_2$ of the narrowed portion 48.

An external tube 50, having a generally cylindrical shape, is located on the center axis A radially spaced apart from the main tube 34. The external tube 50 extends annularly about the center axis A between an opened end 52 and a closed end 54. The opened end 52 is located adjacent to the second end 38. The closed end 54 is adjacent to the first end 36. The main tube 34 and the external tube 50 define a compensation chamber 56 extending between the main tube 34 and the external tube 50 and about the center axis A. An end cap 58 is located adjacent to the first end 36 of the main tube 34 attaching to the closed end 54 of the external tube 50 to close the fluid chamber 40, 42 and the compensation chamber 56. A mounting ring 59, having a generally circular shape, attaches to the end cap 58 for mounting the external tube 50 to a vehicle. It should be appreciated that the present invention is not limited to a twin-tube type hydraulic damper, the present invention can also be implemented in a single tube type hydraulic damper.

A main piston 60, having a generally cylindrical shape, is located in the fluid chamber 40, 42 and slidable in the fluid chamber 40, 42. The main piston 60 divides fluid chamber 40, 42 into a compression chamber 40 and a rebound chamber 42. The compression chamber 40 extends between the first end 36 and the main piston 60. The rebound chamber 42 extends between the second end 38 and the main piston 60. A piston rod guide 62 is located in the rebound chamber 42, adjacent to the second end 38 of the main tube 34, in sealing engagement with the second end 38 of the main tube 34 and the opened end 52 of the external tube 50 to close the fluid chamber 40, 42 and the compensation chamber 56. The piston rod guide 62 defines a bore 64, having a generally cylindrical shape, extending along the center axis A and in communication with the rebound chamber 42. A piston rod 66, having a generally cylindrical shape, extends along the center axis A through the bore 64 and into the rebound chamber 42 to a distal end 68. The piston rod 66 attaches to the main piston 60 at the distal end 68 for moving the main piston 60 between a compression stroke and a rebound stroke in the fluid chamber 40, 42. During the compression stroke, the piston rod 66 and the main piston 60 move towards the first end 36 of the main tube 34. During the rebound stroke, the piston rod 66 and the main piston 60 move toward the second end 38 of the main tube 34.

The main piston 60 has a compression surface 70 and a rebound surface 72. The compression surface 70 is located in the compression chamber 40 facing the first end 36 of the main tube 34. The rebound surface 72 is located in the rebound chamber 42 facing the second end 38 of the main tube 34. The main piston 60 defines a plurality of passages 74, 76 including a set of inner passages 74 and a set of outer passages 76. The inner passages 74 are located about the center axis A, circumferentially spaced apart from one another, extending from the compression surface 70 to the rebound surface 72. The outer passages 76 are located about the center axis A, radially spaced apart from the inner passages 74, extending from the compression surface 70 to the rebound surface 72. In other words, the inner passages 74 are disposed closer to the center axis A than the outer passages 76. The passages 74, 76 extend through the main piston 60 for allowing working fluid flow through the passages 74, 76 during the compression stroke and the rebound stroke. A compression valve 78, including a plurality of discs with each of the discs having a generally circular shape, is located on the rebound surface 72 of the main piston 60 covering the outer passages 76 for limiting working fluid flow through the main piston 60 during the compression stroke to provide a damping force during the compression stroke. A rebound valve 80, having a plurality of discs with each of the discs having a generally circular shape, is located on the compression surface 70 of the main piston 60 covering the inner passages 74 for limiting working fluid flow through the main piston 60 during the rebound stroke to provide a damping force during the rebound stroke.

A piston rod extender 82, having a generally cylindrical shape, attaches to the distal end 68 of the piston rod 66 and extends along the center axis A to a terminal end 84. A threaded projection 86, having a generally cylindrical shape, extends outwardly from the terminal end 84 to a projection end 88.

A hydraulic compression stop 90, disposed in the compression chamber 40, attaches to the first end 36 of the main tube 34 for providing additional damping force during the compression stroke. A base valve 92 is located in the rebound chamber 42 and coupled to the first end 36 of the main tube 34. The base valve 92 defines a plurality of conduits 94 in fluid communication with the compression chamber 40 and the compensation chamber 56. The base valve 92 includes a first damping valve 96, having a plurality of discs with each of the discs having a generally circular shape, covering the conduits 94 for regulating working fluid flow from the compression chamber 40 to the compensation chamber 56 during the compression stroke to provide an additional damping force. A second damping valve 98, having a plurality of discs with each of the discs having a generally circular shape, disposed adjacent to the closed end 52 of the external tube 50 covering the conduits 94 for regulating working fluid flow to the compensation chamber 56 during the rebound stroke to provide an additional damping force.

The hydraulic compression stop 90 includes an additional piston 100, having a generally cylindrical shape, attaches to the piston rod 66, axially spaced from the main piston 60. According to one arrangement, the additional piston 100 is located about the threaded projection 86 for movement with the piston rod 66 during the compression stroke and the rebound stroke to engage the narrowed portion 48 of the main tube 34 during the compression stroke or the rebound stroke to provide the additional damping force. According to an embodiment of the present invention, the additional piston 100 is locate in the compression chamber and coupled to the piston rod 66 for movement with the piston rod 66 to provide the additional damping force during the compression stroke. It should be appreciated that, within the narrowed portion 48, the additional piston 100 can also provide an additional damping force during the rebound stroke as the piston rod 66, the main piston 60, and the additional piston 100 move toward the piston rod guide 62.

The additional piston 100 has a top surface 102 and a bottom surface 104. The top surface 102 faces the second end 38 of the main tube 34. The bottom surface 104 faces the first end 36 of the main tube 34. The additional piston 100 defines a plurality of pathways 106, located about the center axis A and circumferential spaced from one another, extending through the additional piston 100 for allowing working fluid to flow through the additional piston 100. A top valve 108, including a plurality of discs with each of the discs having a generally circular shape, is located on the top surface 102 covering the pathways 106 for regulating working fluid flow during the compression stroke to provide the additional damping force. A bottom valve 110, including a plurality of discs with each of the discs having a generally circular shape, located on the bottom surface 104 covering the pathways 106 for regulating working fluid flow during the rebound stroke to provide the additional damping force.

The additional piston 100 defines a recess 112 located between the top surface 102 and the bottom surface 104. The recess 112 extends annularly about the additional piston 100 and is in fluid communication with the pathways 106. The recess 112 is bounded by an upper surface 114 and a lower surface 116. The upper surface 114 faces the first end 36 of the main tube 34. The lower surface 116 faces the second end 38 of the main tube 34. A ring 118 is slidably disposed in the recess 112 for engagement with the narrowed portion 48 of the main tube 34 during the compression stroke and rebound stroke. During operation, the ring 118 tends to bend when entering the narrowed portion 48 of the main tube 34. Due to the clearance between the additional piston 100 and the ring 118, the bending of the ring 118 leads to formation of a high pressure oil cushion, under the bended ring 118, between the ring 118 and the additional piston 100. The high pressure oil cushion affects the sealing engagement between the ring 118 and the upper surface 114 of the recess 112 by maintaining a clearance gap between the ring 118 and the additional piston 100. Due to the formation of the clearance gap, micro-leak (slit) from the high pressure oil cushion occurs which leads to a squeaking noise during the operation of the hydraulic damper assembly 20.

As best illustrated in FIGS. 3-8, the additional piston 100 includes an anti-noise member 120 located in the recess 112 whereby the anti-noise member 120 releases fluid pressure between the ring 118 and the upper surface 114 of the recess 112 thereby reducing noise generation. In other words, the anti-noise member 120 prevents the formation of the high pressure oil cushion between the ring 118 and the additional piston 100 thereby reducing noises generated during the operation of the hydraulic damper assembly 20. In order to prevent the formation of the high pressure oil cushion, the anti-noise member 120 ensures proper contact between the bend ring 118 and the upper surface 114 of the recess 112 to eliminate the formation of high pressure oil cushions, thereby eliminating the micro-leaks.

According to an embodiment of the present invention, as best illustrated in FIG. 3, the anti-noise member 120 is a convex surface 122 being present on the upper surface 114 of the recess 112 for engagement with the ring 118 during the compression stroke and the rebound stroke. As the ring 118 enters the narrowed portion 48 of the main tube 34, the ring 118 bends along the convex surface 122. By bending along the convex surface 122, the bend ring 118 is in an abutment relationship with the upper surface 114 of the recess 112, thereby preventing the formation of the clearance gap between the ring 118 and the upper surface 114 of the recess 112 to eliminate the formation of the high pressure oil cushion.

Figure 4:
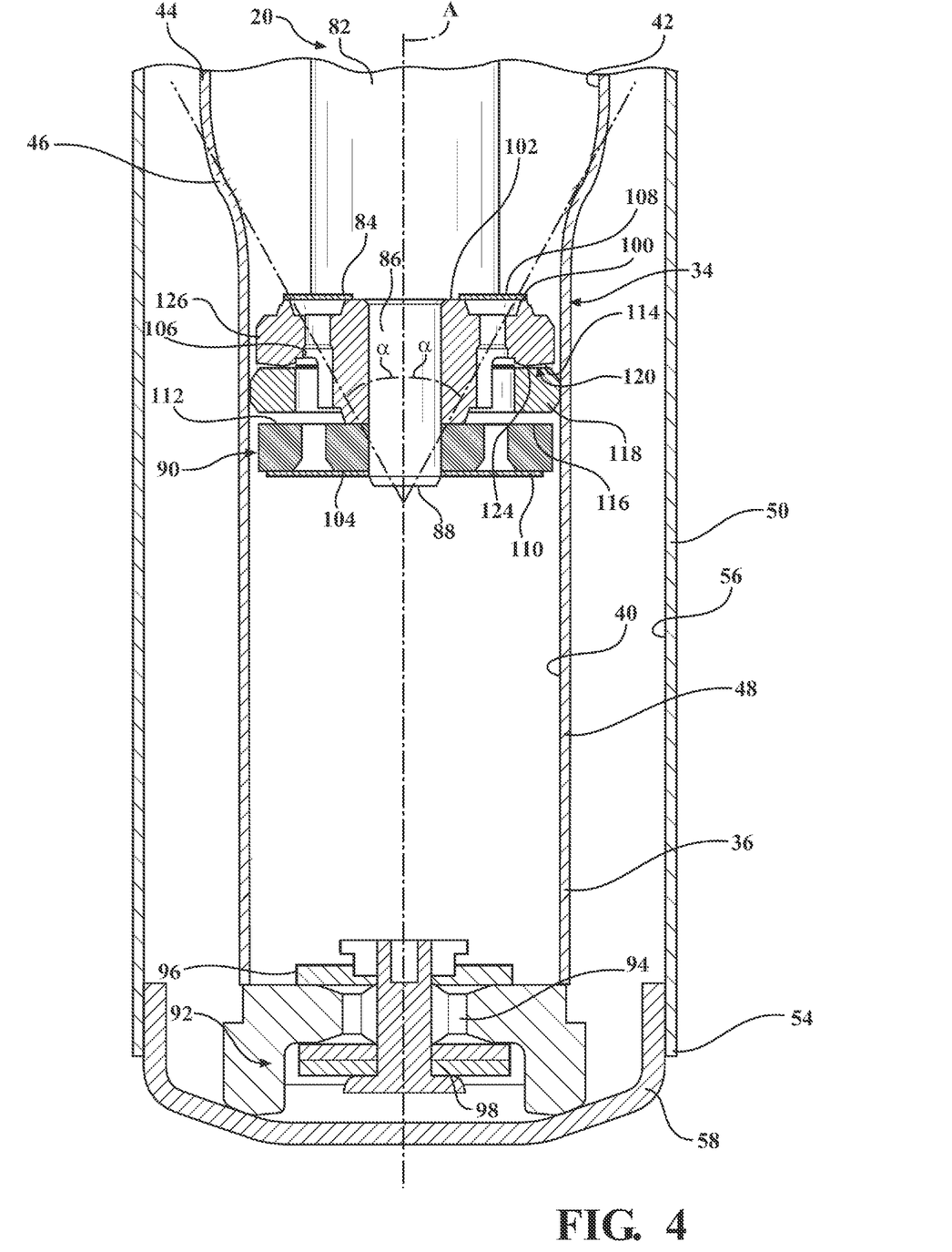
FIG. 4 is a cross-sectional exploded view of the hydraulic damper assembly including a hydraulic compression stop according to another embodiment of the present invention.
Figure 5:
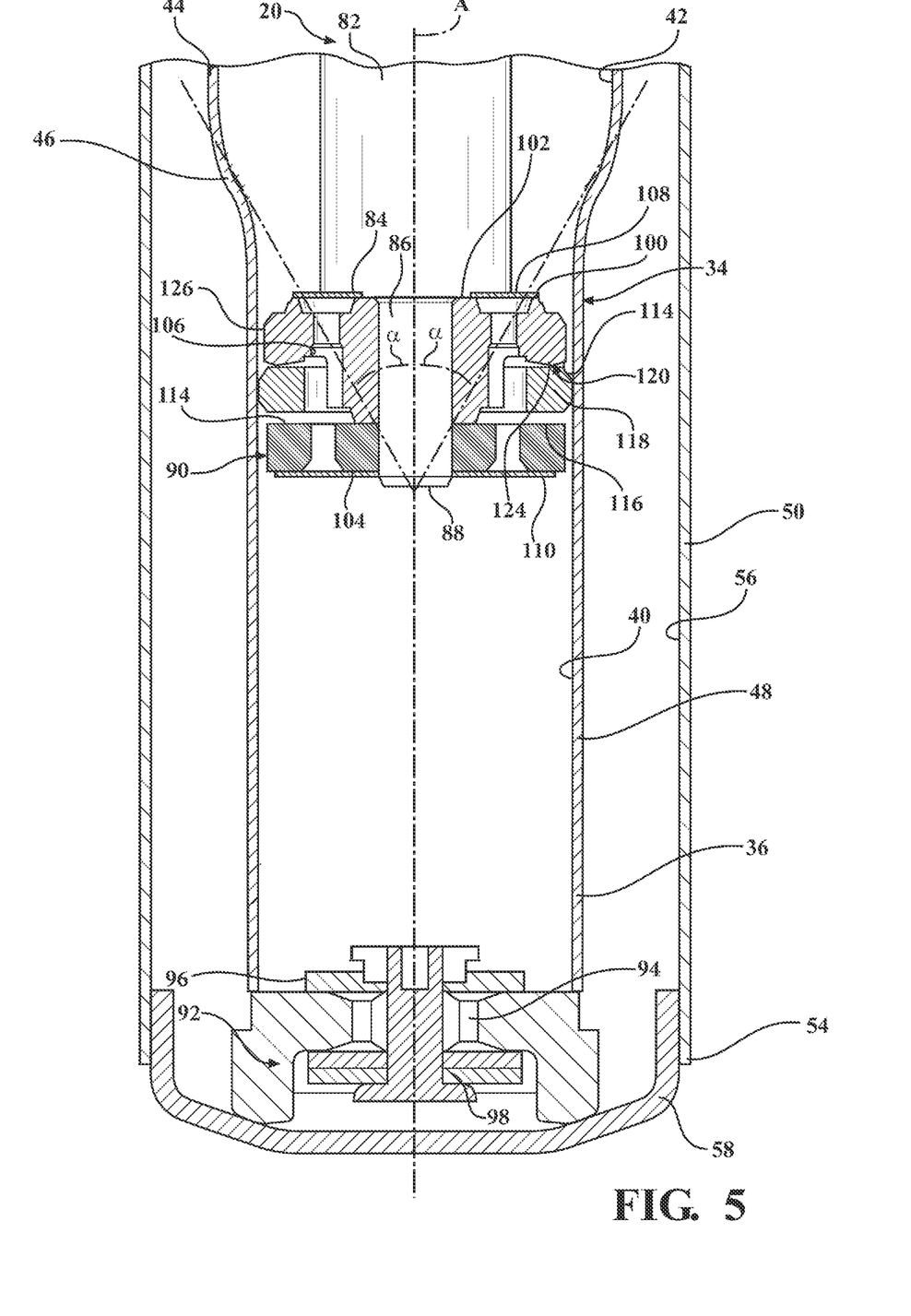
FIG. 5 is a cross-sectional exploded view of the hydraulic damper assembly including a hydraulic compression stop according to another embodiment of the present invention.

According to an embodiment of the present invention, as best illustrated in FIGS. 4 and 5, the anti-noise member 120 is a sloped peak 124 extending outwardly from the upper surface 114 of the recess 112 for engagement with the ring 118 during the compression stroke and the rebound stroke. As best shown in FIG. 4, the sloped peak 124 is located adjacent to and space from the pathways 106. As best illustrated in FIG. 5, the sloped peak 124 is located adjacent to and spaced apart from an outer surface 126 of the additional piston 100. As the ring 118 enters the narrowed portion 48 of the main tube 34, the ring 118 engages the sloped peak 124 and bends along the sloped peak 124. By bending along the sloped peak 124, the bend ring 118 is in an abutment relationship with the upper surface 114 of the recess 112, thereby preventing the formation of the clearance gap between the ring 118 and the upper surface 114 of the recess 112 to eliminate the formation of the high pressure oil cushion.

Figure 6:
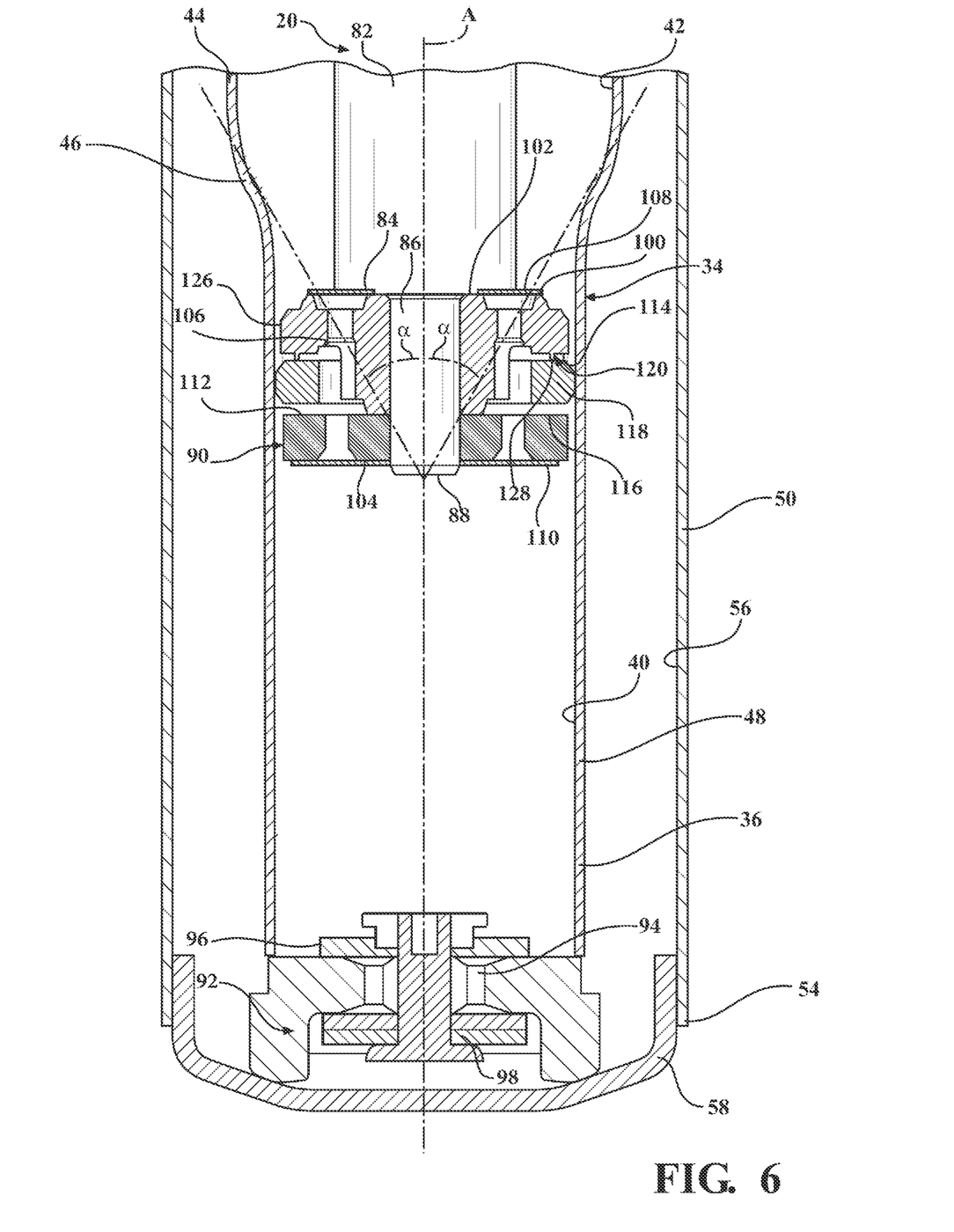
FIG. 6 is a cross-sectional exploded view of the hydraulic damper assembly including a hydraulic compression stop according to another embodiment of the present invention.

According to another embodiment of the present invention, as best shown in FIG. 6, the upper surface 114 of the recess 112 includes a protrusion 128, located at a midpoint between an outer surface 126 of the additional piston 100 and the pathway 106, extending toward the lower surface 116 and annularly about the center axis A for engagement with the ring 118 during the compression stroke and the rebound stroke. As the ring 118 enters the narrowed portion 48 of the main tube 34, the ring 118 abuts the protrusion 128. By abutting the protrusion 128, the bend ring 118 is in an abutment relationship with the upper surface 114 of the recess 112, thereby preventing the formation of the clearance gap between the ring 118 and the upper surface 114 of the recess 112 to eliminate the formation of the high pressure oil cushion.

Figure 7:
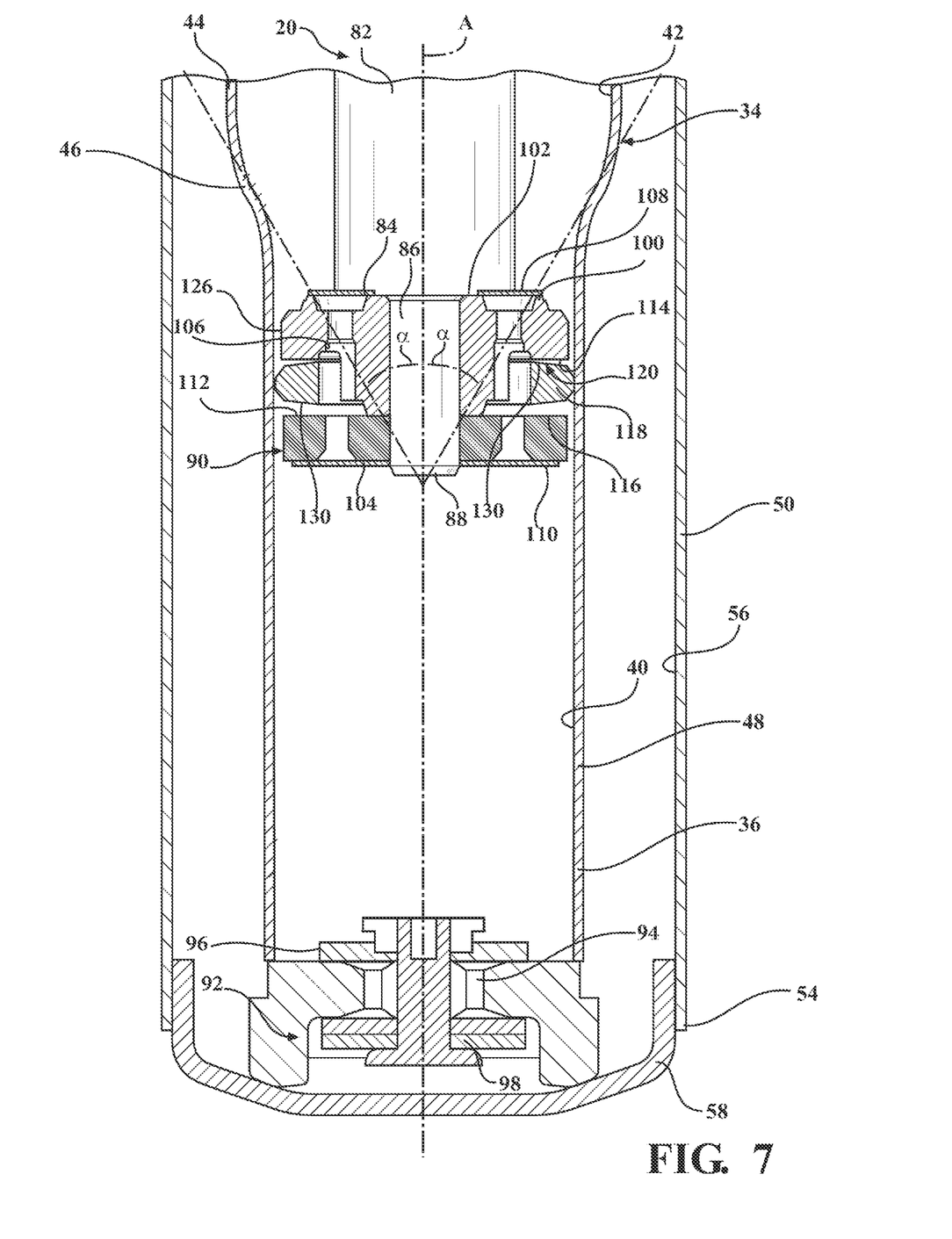
FIG. 7 is a cross-sectional exploded view of the hydraulic damper assembly including a hydraulic compression stop according to another embodiment of the present invention.

According to an embodiment of the present invention, as best shown in FIG. 7, the ring 118 has a pair of tapered surfaces 130, opposite one another, for engagement with the upper surface 114 during the compression stroke and the rebound stroke. As the ring 118 enters the narrowed portion 48 of the main tube 34, the tapered surfaces 130 of the ring 118 allows the ring 118 to be in an abutment relationship with the upper surface 114 of the recess 112, thereby preventing the formation of the clearance gap between the ring 118 and the upper surface 114 of the recess 112 to eliminate the formation of the high pressure oil cushion.

Figure 8:
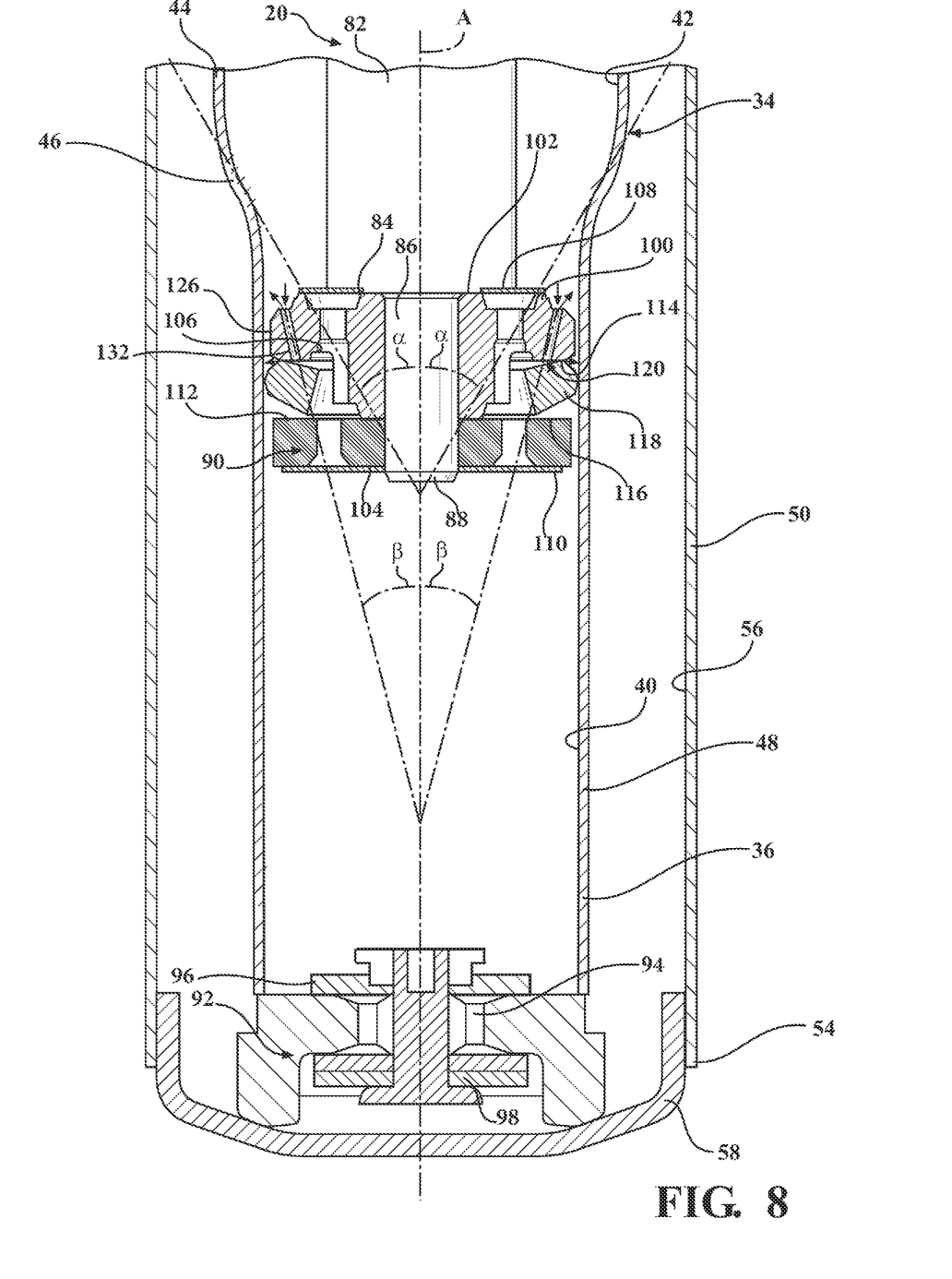
FIG. 8 is a cross-sectional exploded view of the hydraulic damper assembly including a hydraulic compression stop according to another embodiment of the present invention.

According to an embodiment of the present invention, as best shown in FIG. 8, the anti-noise member 120 defines at least one opening 132, radially spaced from the pathways 106, and extending between the top surface 102 of the additional piston 100 and the upper surface 114 of the recess 112 to allow working fluid flow from the recess 112 through the additional piston 100 to reduce fluid pressure build up in the recess 112. By allowing additional fluid to flow between the ring 118 and the upper surface 114, the opening 132 provides an escape route for the fluids between the ring 118 and the upper surface 114 thus preventing any pressure build up between the ring 118 and the upper surface 114 thereby preventing the formation of the clearance gap between the ring 118 and the upper surface 114 of the recess 112. In one arrangement, the at least one opening 132 includes a plurality of openings 132 located about the center axis A and circumferentially spaced apart from one another. According to another arrangement, the at least one opening 132 extends from the top surface 102 of the additional piston 100 to the upper surface 114 of the recess 112 at an oblique angle β of less than 90° relative to the center axis A.

It should be noted that the hydraulic damper assembly 20 of the present invention can also be used in a high damping hydraulic damper 220. A best illustrated in FIG. 9, the high damping hydraulic damper 220 includes a main tube 222, having a generally cylindrical shape, disposed on a center axis A extending annularly about the center axis A between a first end 224 and a second end 226. The main tube 222 defines a fluid chamber 228, 230 extending along the center axis A between the first end 224 and the second end 226 for containing a working fluid. An external tube 232, having a generally cylindrical shape, is disposed on a center axis A, radially spaced from the main tube 222, and extends annularly about the center axis A between an opened end 234 and a closed end 236. The opened end 234 is located adjacent to the second end 226. The closed end 236 is adjacent to the first end 224. The main tube 222 and the external tube 232 define a compensation chamber 238 extending about the center axis A and the main tube 222 and the external tube 232. An end cap 240 is located adjacent to the first end 224 of the main tube 222 attaching to the closed end 236 of the external tube 240 to close the fluid chamber 228, 230 and the compensation chamber 238. A mounting ring 242, having a generally circular shape, attaches to the end cap 240 for mounting the external tube 240 to a vehicle.

Figure 9:
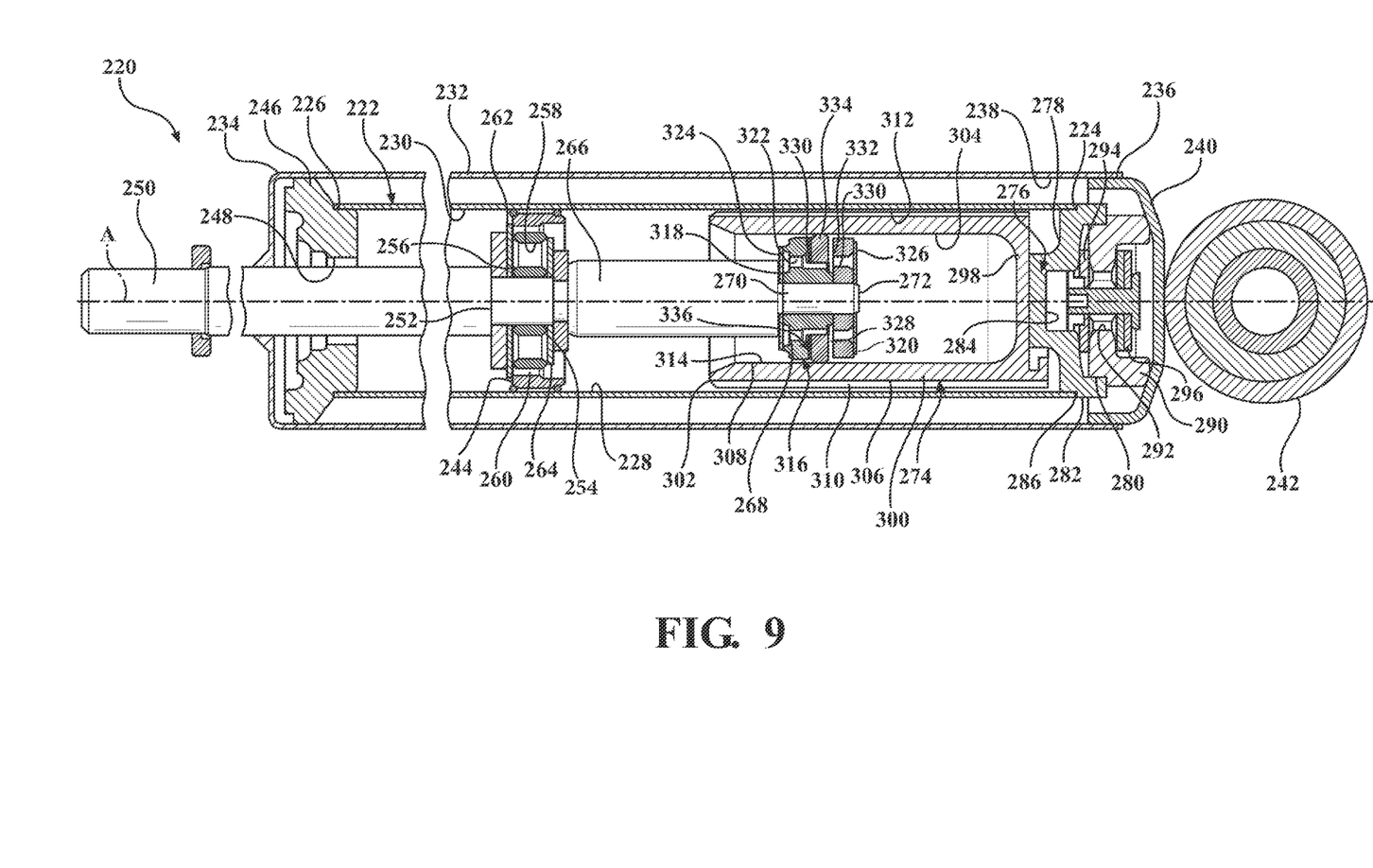
FIG. 9 is a cross-sectional perspective view of the hydraulic damper assembly including a hydraulic compression stop constructed according to yet another embodiment of the present invention.

A main piston 244, having a generally cylindrical shape, is located in the fluid chamber 228, 230. The main piston 244 is slidable in the fluid chamber 228, 230 and divides the fluid chamber 228, 230 into a compression chamber 228 and a rebound chamber 230. The compression chamber 228 extends between the first end 224 and the main piston 244. The rebound chamber 230 extends between the second end 226 and the main piston 244. A piston rod guide 246 is located in the rebound chamber 230, adjacent to the second end 226 of the main tube 244, in sealing engagement with the second end 226 of the main tube 222 and the opened end 234 of the external tube 232 to close the fluid chamber 228, 230 and the compensation chamber 238. The piston rod guide 246 defines a bore 248, having a generally cylindrical shape, extending along the center axis A and in communication with the rebound chamber 230. A piston rod 250, having a generally cylindrical shape, extends along the center axis A through the bore 248 and into the rebound chamber 230 to a distal end 252. The piston rod 250 attaches to the main piston 244 at the distal end 252 for moving the main piston 244 between a compression stroke and a rebound stroke in the fluid chamber 228, 230. During the compression stroke, the piston rod 250 and the main piston 244 move towards the first end 224 of the main tube 222. During the rebound stroke, the piston rod 250 and the main piston 244 move toward the second end 226 of the main tube 222.

The main piston 244 has a compression surface 254 and a rebound surface 256. The compression surface 254 is located in the compression chamber 228 facing the first end 224. The rebound surface 256 is located in the rebound chamber 230 facing the second end 226. The main piston 244 defines a plurality of passages 258, 260 including a set of inner passages 258 and a set of outer passages 260. The inner passages 258 are located about the center axis A, circumferentially spaced apart from one another, extending from the compression surface 254 to the rebound surface 256. The outer passages 260 are located about the center axis A, radially spaced apart from the inner passages 258, extending from the compression surface 254 to the rebound surface 256. In other words, the inner passages 258 are located closer to the center axis A than the outer passages 260. The passages 258, 260 extend through the main piston 244 for allowing working fluid flow through the passages 258, 260 during the compression stroke and the rebound stroke. A compression valve 262, including a plurality of discs with each of the discs having a generally circular shape, is located on the rebound surface 256 of the main piston 244 covering the outer passages 260 for limiting working fluid flow through the main piston 244 during the compression stroke to provide a damping force during the compression stroke. A rebound valve 264, having a plurality of discs with each of the discs having a generally circular shape, is located on the compression surface 254 of the main piston 244 covering the inner passages 258 for limiting working fluid flow through the main piston 244 during the rebound stroke to provide a damping force during the rebound stroke.

A piston rod extender 266, having a generally cylindrical shape, attaches to the distal end 252 of the piston rod 250 and extends along the center axis A to a terminal end 268. A threaded projection 270, having a generally cylindrical shape, extends outwardly from the terminal end 268 to a projection end 272.

A hydraulic compression stop 274, located in the compression chamber 228, attaches to the first end 224 of the main tube 222 for providing additional damping force during the compression stroke. The hydraulic compression stop 274 includes a fixing member 276, having a generally cylindrical shape, attached to the first end 224 of the main tube 222. The fixing member 276 includes a body 278, having a generally cylindrical shape, located on the center axis A in the compression chamber 238. The body 278 has an internal surface 280 and an external surface 282. The internal surface 280 extends annularly about the center axis A defining a pocket 284. The external surface 282 extends annularly about the center axis A defining a shoulder 286 for receiving the first end 224 of the main tube 222. The body 278 defines at least one axial channel (not shown). According to one arrangement, the at least one axial channel (not shown) can include a plurality of channels, e.g. eight, located about the center axis A. The channels (not shown) are circumferentially spaced apart from one another to allow working fluid flow from the compression chamber 228 to the compensation chamber 238.

A base valve 290 is located in the pocket 284 of the body 278 coupled to the internal surface 280 of the fixing member 276 adjacent to the closed end 236 of the external tube 232. The base valve 290 defines a plurality of conduits 292 in fluid communication with the compression chamber 228 and the compensation chamber 238. The base valve 290 includes a first damping valve 294, having a plurality of discs with each of the discs having a generally circular shape, located adjacent to the body 278 covering the conduits 292 for regulating working fluid flow from the compression chamber 228 to the compensation chamber 238 during the compression stroke to provide an additional damping force. A second damping valve 296, having a plurality of discs with each of the discs having a generally circular shape, located adjacent to the closed end 236 of the external tube 232 covering the conduits 292 for regulating working fluid flow to the compensation chamber 238 during the rebound stroke to provide an additional damping force.

An insert 298, 300, having a generally cylindrical shape, is located in the compression chamber 228 and couples to the fixing member 276. The insert 298, 300 is radially spaced from the main tube 222 and extends along the center axis A toward the second end 226 of the main tube 222. The insert 298, 300 includes a bottom 298 and a wall 300. The bottom 298, having a generally circular shape, attaches to the fixing member 276. The wall 300 extends outwardly from the bottom 298, annularly about the center axis A, toward the second end 226 to an insert end 302. The bottom 298 and the wall 300 collectively define a compartment 304, in communication with the compression chamber 228, extending along the center axis A between the insert end 302 and the bottom 298. The wall 300 includes an exterior surface 306 and an interior surface 308. In one arrangement, the exterior surface 306 can include a plurality of ribs 310, e.g. five ribs, circumferentially spaced from one another, extending outwardly from the exterior surface 306 between the bottom 298 and the insert end 302 thereby defining a slot 312 extending between each of adjacent ribs 310 for allowing the working fluid to flow from the compression chamber 228 to the compensation chamber 238. According to another arrangement, the interior surface 308 can define a plurality of grooves 314 extending from the insert end 302 toward the bottom 298 for restricting working fluid flow into the compartment 304.

An additional piston 316, having a generally cylindrical shape, attaches to the piston rod 250, axially spaced from the main piston 244. According to one arrangement, the additional piston 244 is located about the threaded projection 270 for movement with the piston rod 250 during the compression stroke and the rebound stroke to engage the insert 298, 300 during the compression stroke or the rebound stroke to provide the additional damping force. The additional piston 316 has a top surface 318 and a bottom surface 320. The top surface 318 faces the second end 226 of the main tube 222. The bottom surface 320 faces the first end 224 of the main tube 222. The additional piston 316 defines a plurality of pathways 322, located about the center axis A and circumferential spaced from one another, extending through the additional piston 316 for allowing working fluid to flow through the additional piston 316. A top valve 324, including a plurality of discs with each of the discs having a generally circular shape, is located on the top surface 318 covering the pathways 322 for regulating working fluid flow during the compression stroke to provide the additional damping force. A bottom valve 326, including a plurality of discs with each of the discs having a generally circular shape, is located on the bottom surface 320 covering the pathways 322 for regulating working fluid flow during the rebound stroke to provide the additional damping force.

The additional piston 316 defines a recess 328 located between the top surface 318 and the bottom surface 320. The recess 328 extends annularly about the additional piston 316 and is in fluid communication with the pathways 322. The recess 328 is bounded by an upper surface 330 and a lower surface 332. The upper surface 330 faces the first end 224 of the main tube 222. The lower surface 332 faces the second end 226 of the main tube 222. A ring 334 is slidably disposed in the recess 328 for engagement with the insert 298, 300 during the compression stroke and rebound stroke. During operation, the ring 334 tends to bend when entering the insert 298, 300. Due to the clearance between the additional piston 316 and the ring 334, it leads to formation of a high pressure oil cushion, under the bended ring 334, between the ring 334 and the additional piston 316. The high pressure oil cushion affects the sealing engagement between the ring 334 and the upper surface 330 of the recess 328 by maintaining a clearance gap between the ring 334 and the additional piston 316. Due to the formation of the clearance gap, micro-leak (slit) from the high pressure oil cushion occurs which leads to a squeaking noise during the operation of the hydraulic damper assembly 220.

Similar to the illustration in FIGS. 3-8, the additional piston 316 includes an anti-noise member 336 located in the recess 328 whereby the anti-noise member 336 releases fluid pressure between the ring 334 and the upper surface 330 of the recess 328 thereby reducing noise generation. In other words, the anti-noise member 336 prevents the formation of the high pressure oil cushion between the ring 334 and the additional piston 316 thereby reducing noises generated during the operation of the hydraulic damper assembly 220. In order to prevent the formation of the high pressure oil cushion, the anti-noise member 336 ensures proper contact between the bend ring 334 and the upper surface 330 of the recess 328 to eliminate the formation of high pressure oil cushions thereby eliminating the micro-leaks.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A hydraulic damper assembly comprising:
a main tube disposed on a center axis extending between a first end and a second end defining a fluid chamber extending along said center axis for containing a working fluid;
a main piston slidably disposed in said fluid chamber and movable along said center axis dividing said fluid chamber into a compression chamber between said first end and said main piston and a rebound chamber between said second end and said main piston;
a piston rod extending along said center axis and attached to said main piston for moving said main piston between a compression stroke and a rebound stroke;
an additional piston coupled to said piston rod and axially spaced from said main piston, located in said fluid chamber, to provide an additional damping force during said compression stroke and said rebound stroke;
said additional piston having a top surface and a bottom surface and defining at least one pathway extending through said additional piston;
said additional piston defining a recess bounded by an upper surface and a lower surface, the recess being located between said top surface and said bottom surface and extending about said additional piston;
a ring slidably disposed in said recess; and
said additional piston including an anti-noise member located in said recess whereby said anti-noise member releases fluid pressure between said ring and said upper surface of said recess thereby reducing noise generation during said compressions stroke and said rebound stroke,
wherein said anti-noise member includes: a convex surface, a sloped peak, or at least one opening,
wherein when said anti-noise member includes the convex surface, the convex surface is located on said upper surface of said recess for engagement with said ring during said compression stroke and said rebound stroke,
wherein when said anti-noise member includes the sloped peak, the sloped peak extends outwardly from said upper surface of said recess, and is located adjacent to and spaced from said pathway or an outer surface of said additional piston, for engagement with said ring during said compression stroke and said rebound stroke,
wherein when said anti-noise member includes the at least one opening, said at least one opening is radially spaced from said at least one pathway, and extends between said top surface of said additional piston and said upper surface of said recess to allow additional working fluid flow from said recess through said additional piston to reduce fluid pressure build up in said recess.

2. The hydraulic damper assembly as set forth in claim 1, wherein said anti-noise member includes the convex surface located on said upper surface of said recess for engagement with said ring during said compression stroke and said rebound stroke.

3. The hydraulic damper assembly as set forth in claim 1, wherein said anti-noise member includes the sloped peak extending outwardly from said upper surface of said recess, located adjacent to and spaced from said pathway, for engagement with said ring during said compression stroke and said rebound stroke.

4. The hydraulic damper assembly as set forth in claim 1, wherein said anti-noise member includes the sloped peak extending outwardly from said upper surface of said recess, located adjacent to and spaced from an outer surface of said additional piston, for engagement with said ring during said compression stroke and said rebound stroke.

5. The hydraulic damper assembly as set forth in claim 1, wherein said anti-noise member includes the at least one opening, radially spaced from said at least one pathway, and extending between said top surface of said additional piston and said upper surface of said recess to allow additional working fluid flow from said recess through said additional piston to reduce fluid pressure build up in said recess.

6. The hydraulic damper assembly as set forth in claim 5, wherein said at least one opening includes a plurality of openings disposed about said center axis and circumferentially spaced from one another.

7. The hydraulic damper assembly as set forth in claim 5, wherein said at least one opening extends from said top surface of said additional piston to said upper surface of said recess at an oblique angle relative to said center axis.

8. The hydraulic damper assembly as set forth in claim 7, wherein said oblique angle is less than 90°.

9. A hydraulic damper assembly comprising:
a main tube disposed on a center axis extending between a first end and a second end defining a fluid chamber extending along said center axis for containing a working fluid;
an external tube disposed spaced apart from said main tube and extending about said main tube between a closed end and an opened end with said closed end being adjacent to said first end and said opened end being adjacent said second end defining a compensation chamber between said main tube and said external tube;

a cap attaching to said closed end to close said fluid chamber and said compensation chamber;

a main piston slidably disposed in said fluid chamber and movable along said center axis dividing said fluid chamber into a compression chamber between said first end and said main piston and a rebound chamber between said second end and said main piston;

a piston rod extending along said center axis attached to said main piston for moving said main piston between a compression stroke and a rebound stroke;

an additional piston coupled to said piston rod and axially spaced from said main piston, located in said fluid chamber, to provide an additional damping force during said compression stroke and said rebound stroke;

said additional piston having a top surface and a bottom surface and defining at least one pathway extending through said additional piston;

said additional piston defining a recess bounded by an upper surface and a lower surface, the recess being located between said top surface and said bottom surface and extending about said additional piston;

a ring slidably disposed in said recess; and said additional piston including an anti-noise member located in said recess whereby said anti-noise member releases fluid pressure between said ring and said upper surface of said recess thereby reducing noise generation during said compressions stroke and said rebound stroke, wherein said anti-noise member includes: a convex surface, a sloped peak, or at least one opening, wherein when said anti-noise member includes the convex surface, the convex surface is located on said upper surface of said recess for engagement with said ring during said compression stroke and said rebound stroke, wherein when said anti-noise member includes the sloped peak, the sloped peak extends outwardly from said upper surface of said recess, and is located adjacent to and spaced from said pathway or an outer surface of said additional piston, for engagement with said ring during said compression stroke and said rebound stroke, wherein when said anti-noise member includes the at least one opening, said at least one opening is radially spaced from said at least one pathway, and extends between said top surface of said additional piston and said upper surface of said recess to allow additional working fluid flow from said recess through said additional piston to reduce fluid pressure build up in said recess.

10. The hydraulic damper assembly as set forth in claim 9 wherein said anti-noise member includes the convex surface located on said upper surface of said recess for engagement with said ring during said compression stroke and said rebound stroke.

11. The hydraulic damper assembly as set forth in claim 9 wherein said anti-noise member includes the sloped peak extending outwardly from said upper surface of said recess, located adjacent to and spaced from said pathway, for engagement with said ring during said compression stroke and said rebound stroke.

12. The hydraulic damper assembly as set forth in claim 9, wherein said anti-noise member includes the sloped peak extending outwardly from said upper surface of said recess, located adjacent to and spaced from an outer surface of said additional piston, for engagement with said ring during said compression stroke and said rebound stroke.

13. The hydraulic damper assembly as set forth in claim 9, wherein said anti-noise member includes the at least one opening, radially spaced from said at least one pathway, and extending between said top surface of said additional piston and said upper surface of said recess to allow additional working fluid flow from said recess through said additional piston to reduce fluid pressure build up in said recess.

14. The hydraulic damper assembly as set forth in claim 13, wherein said at least one opening includes a plurality of openings disposed about said center axis and circumferentially spaced from one another.

15. The hydraulic damper assembly as set forth in claim 13, wherein said at least one opening extends from said top surface of said additional piston to said upper surface of said recess at an oblique angle relative to said center axis.

16. The hydraulic damper assembly as set forth in claim 15, wherein said oblique angle is less than 90°.

* * * * *